United States Patent
Le Roux et al.

(10) Patent No.: US 9,968,924 B2
(45) Date of Patent: May 15, 2018

(54) METHOD FOR PREPARING A HYDROGEL COMPRISING SILICO-METALLIC MINERAL PARTICLES AND HYDROGEL

(71) Applicants: Christophe Le Roux, Avignonet Lauragais (FR); Francois Martin, Sainte Foy D' Aigrefeuille (FR); Pierre Micoud, Peyssies (FR); Angela Dumas, Pechabou (FR)

(72) Inventors: Christophe Le Roux, Avignonet Lauragais (FR); Francois Martin, Sainte Foy D' Aigrefeuille (FR); Pierre Micoud, Peyssies (FR); Angela Dumas, Pechabou (FR)

(73) Assignees: CENTRE NATIONAL DE LA RECHERCHE SCIENTIFIQUE (C.N.R.S.), Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 514 days.

(21) Appl. No.: 14/367,702

(22) PCT Filed: Dec. 19, 2012

(86) PCT No.: PCT/FR2012/052994
§ 371 (c)(1),
(2) Date: Sep. 23, 2014

(87) PCT Pub. No.: WO2013/093339
PCT Pub. Date: Jun. 27, 2013

(65) Prior Publication Data
US 2015/0133290 A1 May 14, 2015

(30) Foreign Application Priority Data
Dec. 22, 2011 (FR) .................................. 11 04027

(51) Int. Cl.
| | | |
|---|---|---|
| *B01J 13/00* | (2006.01) | |
| *B01J 37/03* | (2006.01) | |
| *C01B 33/152* | (2006.01) | |
| *C01B 33/38* | (2006.01) | |
| *C01B 33/158* | (2006.01) | |
| *B01J 21/06* | (2006.01) | |
| *B01J 27/10* | (2006.01) | |
| *B01J 31/02* | (2006.01) | |
| *B01J 35/00* | (2006.01) | |

(52) U.S. Cl.
CPC ............ *B01J 37/036* (2013.01); *B01J 21/06* (2013.01); *B01J 27/10* (2013.01); *B01J 31/0285* (2013.01); *B01J 35/0013* (2013.01); *C01B 33/152* (2013.01); *C01B 33/158* (2013.01); *C01B 33/38* (2013.01); *B01J 2531/22* (2013.01)

(58) Field of Classification Search
CPC . B01J 37/036; B01J 21/06; B01J 27/10; B01J 35/0013; B01J 31/0285; B01J 2531/22; C01B 33/158; C01B 33/38; C01B 33/152
USPC .......................................................... 516/100
See application file for complete search history.

(56) References Cited

U.S. PATENT DOCUMENTS

| | | | | |
|---|---|---|---|---|
| 7,794,625 | B2* | 9/2010 | Martin .................... | C01B 33/22 252/378 R |
| 8,202,501 | B2* | 6/2012 | Martin ................... | B82Y 30/00 423/331 |
| 2009/0253569 | A1* | 10/2009 | Martin .................... | C01B 33/22 501/122 |

(Continued)

FOREIGN PATENT DOCUMENTS

WO    2008/009799    1/2008

OTHER PUBLICATIONS

Ferreira et al., Aminopropyl-Modified Magnesium-Phyllosilicates: Layered Solids with Tailored Interlayer Access and Reactivity, Langmuir 2008, 24, 14215-14221.*

(Continued)

*Primary Examiner* — Daniel S Metzmaier
(74) *Attorney, Agent, or Firm* — Young & Thompson

(57) ABSTRACT

A method for preparing a novel hydrogel including silico-metallic mineral particles of the formula $(Si_x(Si\text{-}A)_{1-x})_4 M_3O_{11} \cdot n'H_2O$, in which: x is a real number in the range [0.75; 1], A denotes a group selected from methyl and hydrocarbon groups including at least one heteroatom, and M is a metal selected from the group consisting of magnesium, cobalt, zinc, copper, manganese, iron, nickel and chromium, wherein a coprecipitation reaction is carried out in an aqueous medium between: at least one metal salt of the metal M, sodium metasilicate, $Na_2OSiO_2$, and at least one water-soluble oxysilane of formula (I):

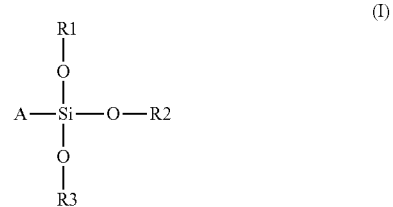

in which R1, R2 and R3 are selected from hydrogen and linear alkyl groups including 1 to 3 carbon atoms.

11 Claims, 1 Drawing Sheet

(56) References Cited

U.S. PATENT DOCUMENTS

| | | | | |
|---|---|---|---|---|
| 2010/0184887 A1* | 7/2010 | Gonzalez | ............... | A61K 8/27 524/99 |
| 2014/0205528 A1* | 7/2014 | Le Roux | ............... | C01B 33/20 423/331 |
| 2016/0137514 A1* | 5/2016 | Le Roux | ............... | C01B 33/44 548/110 |
| 2016/0137849 A1* | 5/2016 | Le Roux | ............... | C09C 1/0081 428/402 |

OTHER PUBLICATIONS

Hawley's Condensed Chemical Dictionary, (2007), John Wiley & Sons, Inc. Online @ http://onlinelibrary.wiley.com/book/10.1002/9780470114735/titles headwords = Sodium Metasilicate, Anhydrous; Sodium Orthosilicate; Sodium Sesquisilicate; Sodium Silicate, downloaded Sep. 29, 2016), pp. 1148-1149, 1151, and 1156.*

Fujii et al., "Synthesis of an Alkylammonium/Magnesium Phyllosilicate Hybrid Nanocomposite Consisting of a Smectite-Like Layer and Organosiloxane Layers", Chem. Mater. 2003, 15, 1189-1197 (Published on Web Feb. 13, 2003).*

Product Information, Grace Davison, LUDOX® HS-30 Colloidal Silica, online @ http://doc.ccc-group.com/spec/553602.pdf (downloaded Nov. 5, 2013), © 2003 W.R. Grace & Co.—Conn., Columbia, Maryland USA, 2 pages.*

International Search Report dated Apr. 24, 2013, in corresponding PCT application.

Chabrol K. et al: "Functionalization of synthetic talc-like phyllosilicates by alkoxyorganosilane grafting". Journal of Materials Chemistry 20101121 Royal Society of Chemistry GBR. vol. 20. No. 43. Nov. 21, 2010 (Nov. 21, 2010). pp. 9695-9706. XP002683079. 001: DOI:10.1039/C0JM01276A the whole document.

Gallego et al.: "Synthesis of new lamellar inorganic-organic talc-hybrids", New Journal of Chemistry, vol. 32, 2008, pp. 407-412, XP002683080, the whole document.

\* cited by examiner

METHOD FOR PREPARING A HYDROGEL COMPRISING SILICO-METALLIC MINERAL PARTICLES AND HYDROGEL

FIELD OF THE INVENTION

The invention relates to a method for preparing a hydrogel comprising silico-metallic mineral particles.

In particular, the invention relates to a method for preparing a hydrogel comprising mineral particles of the organic-inorganic hybrid type.

Throughout the text "mineral particle" denotes any inorganic particle that does not contain carbon or, if necessary, contains carbon only in the form of carbonate or cyanide.

BACKGROUND OF THE INVENTION

Such organic-inorganic hybrids are of increasing interest in various fields of chemistry, especially in the field of catalysis, by virtue of their ability to combine certain advantages of organic compounds and inorganic compounds. The creation of strong interactions between organic and inorganic compounds affords a durable immobilization of organic species on inorganic compounds, conferring the structural order of the inorganic compounds on the organic species.

It is known to functionalize phyllosilicates (lamellar silicates), such as talc, by the grafting of alkoxyorganosilanes. However, the grafting ratios achievable by the resulting organic-inorganic hybrid materials are not satisfactory.

As another alternative to the preparation of organic-inorganic hybrids, methods for the direct synthesis of such materials by the sol-gel route are also known. Such syntheses by the sol-gel route cannot generally be carried out in an aqueous medium.

SUMMARY OF THE INVENTION

In this context one object of the invention is to propose a method for preparing a hydrogel comprising silico-metallic synthetic mineral particles whose structural properties are similar to those of phyllosilicates and/or which can be used as a phyllosilicate precursor.

One object of the invention is to propose an improved method for preparing a hydrogel comprising silico-metallic synthetic mineral particles of the organic-inorganic hybrid type.

A further object of the invention is to propose a method for preparing a hydrogel comprising silico-metallic synthetic mineral particles in an aqueous medium.

A further object of the invention is to propose a method for preparing a hydrogel that can be used as a supported ionic liquid (SIL), e.g. in the field of catalysis.

A further object of the invention is to propose a method for preparing a hydrogel comprising silico-metallic mineral particles that makes it possible to modify the hydrophilic or hydrophobic character of said silico-metallic mineral particles.

One object of the invention is to propose such a method whose implementation is simple, rapid and compatible with the constraints of industrial exploitation, and does not produce polluting chemical waste.

A further object of the invention is to propose a hydrogel such as that mentioned above.

To do this the invention relates to a method for preparing a hydrogel comprising silico-metallic mineral particles of the formula $(Si_x(Si-A)_{1-x})_4M_3O_{11} \cdot n'H_2O$, wherein:

x is a real number in the range of from 0.75 to 1, 1 being excluded from said range, A denotes a group selected from methyl and hydrocarbon groups comprising at least one heteroatom, M is a metal selected from the group consisting of magnesium, cobalt, zinc, copper, manganese, iron, nickel and chromium, and n' refers to a number of water molecules associated with said hydrogel, wherein a coprecipitation reaction is carried out in an aqueous medium between:

at least one metal salt of said metal M, sodium metasilicate, $Na_2OSiO_2$, and at least one water-soluble oxysilane of formula (I):

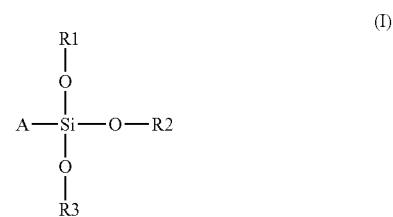

wherein R1, R2 and R3 are identical or different and are selected from hydrogen and linear alkyl groups comprising 1 to 3 carbon atoms.

DETAILED DESCRIPTION OF THE INVENTION

Figure 1:
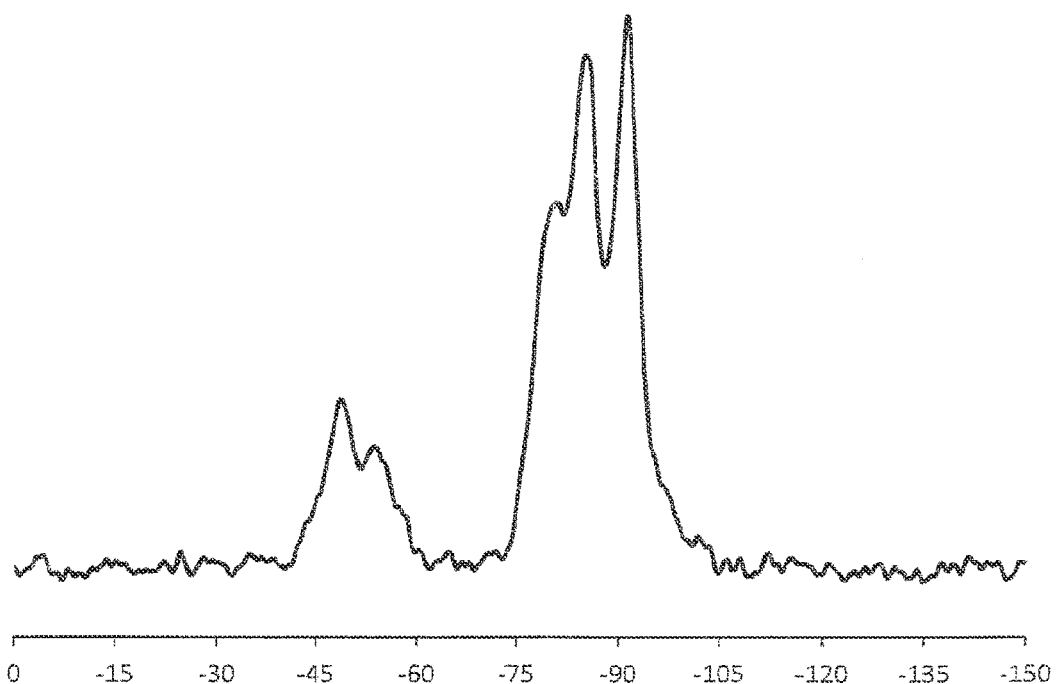
FIG. 1 shows a silicon NMR spectrum, run on a BRUKER® Avance 400® spectrometer, of a composition comprising silico-metallic synthetic mineral particles, obtained by a method according to the invention.

Contrary to all expectation, the inventors have found that it is possible to prepare a hydrogel comprising silico-metallic synthetic mineral particles with hydrocarbon groups by means of a simple precipitation reaction between a metal salt and, as sources of silicon, on the one hand a mineral source of silicon, namely sodium metasilicate, and on the other hand an oxysilane (particularly a trialkoxysilane or a trihydroxysilane) that is soluble in the reaction medium comprising said metal salt and said sodium metasilicate.

Advantageously and according to the invention, said precipitation reaction is carried out in an aqueous medium. Thus the preparation of said hydrogel does not require the use of organic solvents that are hazardous to humans or the environment, but can be carried out totally advantageously in an aqueous medium. In particular, said oxysilane used in a method according to the invention is totally soluble in an aqueous medium.

Advantageously and according to the invention, the group A has formula (II):

wherein R4, R5 and R6 are identical or different and are selected from H— and hydrocarbon groups comprising at least one heteroatom. In particular, in formula (II), at least two of the groups R4, R5 and R6 are hydrogens H—, and the third is hydrogen H—, as well or a hydrocarbon group comprising at least one heteroatom.

Advantageously and according to the invention, in formula (I), A is selected from methyl and hydrocarbon groups of the formula Y—[CH$_2$]$_n$—, wherein:

Y is a group comprising at least one nitrogen atom, and
n is an integer between 3 and 11.

Advantageously and according to the invention, n is an integer between 3 and 11 and particularly between 3 and 5.

Moreover, advantageously and according to the invention, Y is selected from H$_2$N— and

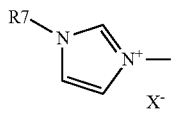

wherein:
R7 is selected from linear alkyl groups comprising 1 to 18 carbon atoms, and
X$^-$ is an anion in which X is selected from chlorine, iodine and bromine.

Advantageously and according to the invention, R7 is selected from linear alkyl groups comprising 1 to 18 carbon atom(s), especially 1 to 10 carbon atom(s) and particularly 1 to 4 carbon atom(s).

Advantageously, Y is a cationic group that is soluble in an aqueous medium and contributes to conferring a water-soluble character on said oxysilane.

More particularly, R1, R2 and R3 are each methyl groups (—CH$_3$) or ethyl groups (—CH$_2$—CH$_3$). Thus, advantageously and according to the invention, said oxysilane has the formula:

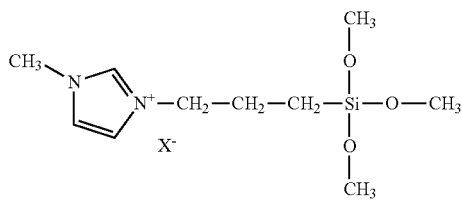

wherein X$^-$ is an anion wherein X is selected from chlorine, iodine and bromine. In this case the oxysilane (a trialkoxysilane) is a 1-trimethoxysilylpropyl-3-methyl-imidazolium salt.

Advantageously and according to the invention, said metal salt, said sodium metasilicate and said oxysilane are brought together in such a way that the atomic ratio between the metal M and the silicon is substantially equal to 0.75. Such an atomic ratio between the metal M and the silicon corresponds to the atomic ratio of a mineral such as talc, in which the metal M is magnesium. This affords e.g. a hydrogel comprising silico-metallic synthetic mineral particles with the stoichiometry of talc (4 atoms of silicon to 3 atoms of magnesium). In other words, said silico-metallic synthetic mineral particles according to the invention comprise 4 atoms of silicon to 3 atoms of metal M.

Moreover, advantageously and according to the invention, the molar ratio between said oxysilane and said sodium metasilicate is between 0.10 and 0.34. The molar ratio between said oxysilane and said sodium metasilicate corresponds to the number of moles of oxysilane(s) over the number of moles of sodium metasilicate brought together in the hydrogel coprecipitation medium.

Thus, advantageously and according to the invention, the atomic percentage of oxysilane relative to the total number of moles of silicon (sodium metasilicate and oxysilane(s)) is between 0.1% and 25%. This affords a composition comprising silico-metallic synthetic mineral particles capable of having hydrocarbon groups in various proportions and, in particular, capable of containing up to 25% of silicon atoms covalently bonded to an organic group, especially a group of the formula A.

Any metal salt of magnesium, cobalt, zinc, copper, manganese, iron, nickel and/or chromium can be used in a method according to the invention. In particular, advantageously and according to the invention, said metal salt is selected from metal chlorides of the formula MCl$_2$ and metal acetates of the formula M(CH$_3$COO)$_2$, it being possible for M to be selected from the group consisting of magnesium, cobalt, zinc, copper, manganese, iron, nickel and chromium. Preferably, said metal salt is selected from MgCl$_2$, CoCl$_2$, ZnCl$_2$, CuCl$_2$, MnCl$_2$, FeCl$_2$, NiCl$_2$, CrCl$_2$, and Mg(CH$_3$COO)$_2$, Co(CH$_3$COO)$_2$, Zn(CH$_3$COO)$_2$, Cu(CH$_3$COO)$_2$, Mn(CH$_3$COO)$_2$, Ni(CH$_3$COO)$_2$ and Cr(CH$_3$COO)$_2$.

Advantageously and according to the invention, following said precipitation reaction, the anion X$^-$ is at least partially exchanged with at least one anionic species selected from a bromide ion, Br$^-$, an iodide ion, I$^-$, a bistrifluoromethanesulfonamide anion, a trifluoromethanesulfonate anion, a hexafluorophosphate anion, a tetrafluoroborate anion, a tetrachloroaluminate anion, an acetate anion, a hydroxide anion, HO$^-$, a nitrate anion NO$^{3-}$, or a nitrite anion NO$^{2-}$. Such a metathetic exchange makes it possible to custom-modify the more or less hydrophilic or hydrophobic character of the silico-metallic synthetic mineral particles prepared. The bistrifluoromethanesulfonamide anion, for example, exhibits a substantial hydrophobic character.

Advantageously and according to the invention, in the case where a trialkoxysilane is used, it is also possible to effect such an at least partial exchange right at the start, i.e. before carrying out said coprecipitation reaction, by adding such an anion to the initial coprecipitation medium.

Advantageously and according to the invention, at least one acid selected from hydrochloric acid (HCl) and acetic acid (CH$_3$COOH) is added to the coprecipitation reaction medium, the total number of moles of chloride ions and acetate ions being equal to the number of moles of sodium, Na, in said coprecipitation reaction medium.

In one modified embodiment according to the invention, said hydrogel coprecipitation reaction is carried out in the presence of an additional salt, especially a salt of the same chemical nature as the salt(s) present in the hydrogel coprecipitation medium, after precipitation of at least part of said hydrogel. Thus, for example, sodium chloride (NaCl) or a carboxylate salt of the formula R$_8$—COOM', wherein:

M' denotes a metal selected from the group consisting of Na and K, and $R_8$ is selected from H and alkyl groups comprising fewer than 5 carbon atoms, is added to the hydrogel coprecipitation reaction medium.

The presence of at least one such additional salt makes it possible to favor the hydrogel coprecipitation reaction and improves the atomic organization of the hydrogel.

Advantageously and according to the invention, the concentration of additional salt(s) in the hydrogel coprecipitation reaction medium is less than 5 mol/l, e.g. between 0.2 mol/l and 4 mol/l.

The invention also covers a hydrogel obtained by a method according to the invention.

The invention therefore further relates to a hydrogel comprising silico-metallic mineral particles of the formula $(Si_x(Si-A)_{1-x})_4M_3O_{11} \cdot n'H_2O$, in which:

x is a real number in the range of from 0.75 to 1, 1 being excluded from said range, A denotes a group selected from methyl and hydrocarbon groups comprising at least one heteroatom, M is a metal selected from the group consisting of magnesium, cobalt, zinc, copper, manganese, iron, nickel and chromium, and n' refers to a number of water molecules associated with said silico-metallic gel.

The invention further relates to a method and a hydrogel which are characterized in combination by all or some of the characteristics mentioned above or below.

Other objects' advantages and characteristics of the invention will become apparent from the description and the Examples which follow.

A/- General Protocol for Preparing a Hydrogel Comprising Silico-Metallic Synthetic Mineral Particles According to the Invention 1/- Preparation of a Hydrogel Comprising Silico-metallic Synthetic Mineral Particles Such a hydrogel comprising silico-metallic mineral particles can be prepared by means of a coprecipitation reaction in an aqueous medium involving, as reactants:

at least one salt of a metal M selected from the group consisting of magnesium, cobalt, zinc, copper, manganese, iron, nickel and chromium, sodium metasilicate, $Na_2OSiO_2$, and at least one water-soluble oxysilane of formula (I):

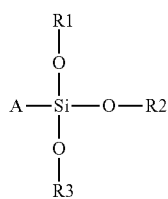

(I)

wherein:

A denotes a group selected from methyl and hydrocarbon groups comprising at least one heteroatom, and R1, R2 and R3 are identical or different and are selected from hydrogen and linear alkyl groups comprising 1 to 3 carbon atoms.

In particular, said oxysilane can be a trialkoxysilane that is soluble in an aqueous medium and has the following formula:

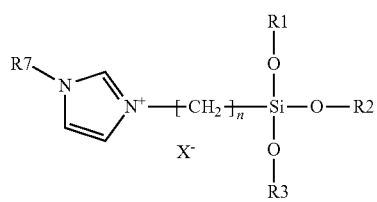

wherein:

R1, R2 and R3 are identical or different and are selected from linear alkyl groups comprising 1 to 3 carbon atoms, R7 is selected from linear alkyl groups comprising 1 to 18 carbon atoms, n is an integer between 1 and 5, and $X^-$ is an anion in which X is selected from chlorine, iodine and bromine.

This coprecipitation reaction between the salt(s) of the metal(s) M, sodium metasilicate and the water-soluble oxysilane (trihydroxysilane or trialkoxysilane) is carried out in such a way that the atomic ratio between the metal M and the silicon is substantially equal to 0.75. It affords a composition comprising silico-metallic synthetic mineral particles with the stoichiometry of talc (4 Si to 3 M).

This reaction is carried out with the following starting materials:

1. an aqueous solution of functionalized oxysilane and sodium metasilicate, and
2. a solution of a salt (or salts) of a metal (or metals) prepared from one salt or a plurality of salts of a metal (or metals) in a solution of hydrochloric acid or acetic acid.

The hydrochloric acid, HCl, and/or acetic acid is/are added to the coprecipitation reaction medium in such a way that the total number of moles of chloride ions and/or acetate ions (originating from the hydrochloric and/or acetic acid and the metal salt(s)) added is equal to the number of moles of sodium, Na (originating from the sodium metasilicate).

This composition comprising silico-metallic synthetic mineral particles is prepared according to the following protocol:

1. the solutions of a salt (or salts) of a metal (or metals) are mixed with the solution of trihydroxysilane or trialkoxysilane and sodium metasilicate; a coprecipitated silico-metallic hydrogel forms instantly;
2. the gel is stirred (e.g. for 5 minutes);
3. the hydrogel is recovered after centrifugation (at between 2000 and 10,000 rpm for 3 to 20 minutes, e.g. at 3500 rpm for 5 minutes) and removal of the supernatant;
4. the hydrogel is washed with distilled or osmosed water, at least two washing/centrifugation cycles being performed;
5. the hydrogel is recovered after centrifugation; and
6. if appropriate, the hydrogel recovered after centrifugation is dried, e.g. by lyophilization and/or drying in an oven, by drying under microwave irradiation or by atomization.

Moreover, it is possible to add, e.g. to the sodium metasilicate solution, at least one additional salt such as sodium chloride, NaCl, or sodium acetate, $CH_3COONa$ (hydrated or non-hydrated). The presence of such a salt makes it possible to favor the hydrogel coprecipitation reaction and obtain a hydrogel with improved properties. Said salt(s) can be added in such a way that their concentration in the hydrogel coprecipitation reaction medium is e.g. between 0.2 mol/l and 4 mol/l.

At the end of this first precipitation phase a hydrogel is obtained which comprises silico-metallic synthetic mineral particles with hydrocarbon groups.

2/- Exchange of $X^-$ with Another Anion

The composition obtained after the hydrogel comprising silico-metallic synthetic mineral particles, as obtained above, has or has not been dried can be added to an aqueous solution comprising e.g. a bromide ion, $Br^-$, an iodide ion, $I^-$, a bistrifluoro-methanesulfonamide anion, a hexafluorophosphate anion, a tetrafluoroborate anion, a tetrachloroaluminate anion, an acetate anion, a hydroxide anion, $HO^-$, a nitrate anion, $NO_3^-$, or a nitrite anion, $NO_2^-$. The concentration of one of these anions in such a solution is between 0.1 mol·$l^{-1}$ and the solubility limit of the chemical species, especially between 0.2 mol·$l^{-1}$ and 3 mol·$l^{-1}$ and particularly between 0.3 mol·$l^{-1}$ and 1.5 mol·$l^{-1}$, e.g. 0.5 mol·$l^{-1}$. Such a metathetic exchange makes it possible to custom-modify the more or less hydrophilic or hydrophobic character of the silico-metallic synthetic mineral particles prepared, the bistrifluoromethanesulfonamide anion, for example, being strongly hydrophobic.

B/- Analysis and Structural Characterization

The results of analysis of a silico-metallic composition comprising functionalized synthetic mineral particles, obtained according to the protocol stated above, are reported below.

The composition comprising silico-metallic synthetic mineral particles was analyzed by nuclear magnetic resonance (NMR).

EXAMPLE 1

A solution of magnesium chloride is prepared by adding 14.07 g of magnesium chloride hexahydrate ($MgCl_2$·$6H_2O$) to 47 ml of 1 mol/l hydrochloric acid, HCl.

A solution of functionalized alkoxysilane and sodium metasilicate is prepared by adding 5.17 g of 1-trimethoxysilylpropyl-3-methylimidazolium chloride and 15.62 g of sodium metasilicate pentahydrate to 200 ml of distilled water.

1-trimethoxysilylpropyl-3-methylimidazolium chloride has the following structural chemical formula:

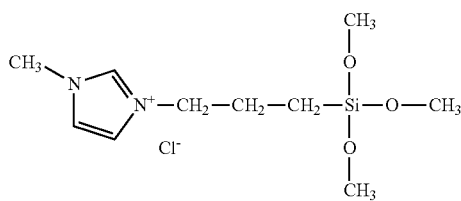

The magnesium chloride solution is added rapidly to the solution of functionalized alkoxysilane and sodium metasilicate; a silico-metallic gel forms instantly. This silico-metallic gel is stirred for 5 minutes and then centrifuged for 5 minutes at 3500 rpm, after which it is washed twice by the addition of 100 ml of distilled water and centrifugation (5 minutes at 3500 rpm).

The recovered silico-metallic gel is then dried by lyophilization at −50° C. under 0.064 mbar. After drying by lyophilization, 7.53 g of a composition comprising functionalized synthetic mineral particles are then recovered as a white powder.

The silicon NMR spectrum (FIG. 1) of this silico-metallic gel makes it possible to identify the presence of Si—O—Si groups (chemical shifts between −75 ppm and −100 ppm) as well as the presence of C—Si—O—Si groups (chemical shifts between −40 ppm and −60 ppm).

Figure 2:
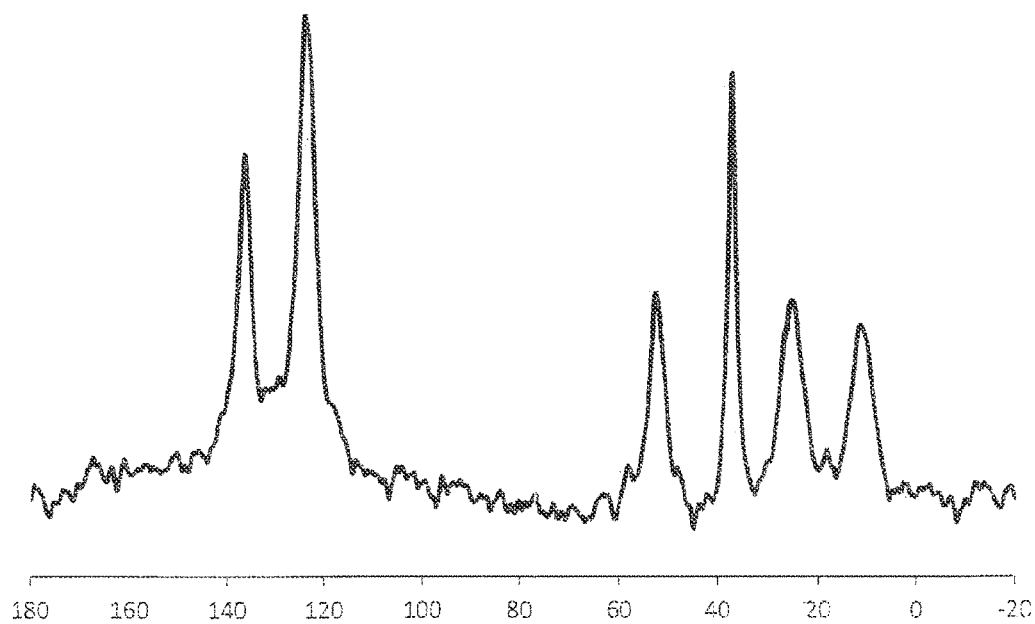
FIG. 2 shows a carbon NMR spectrum, run on a BRUKER® Avance 400® spectrometer, of a composition comprising silico-metallic synthetic mineral particles, obtained by a method according to the invention.

The carbon NMR spectrum (FIG. 2) of this silico-metallic gel makes it possible to identify the presence of an imidazolium group (chemical shifts between 120 ppm and 140 ppm) as well as the presence of a methyl group and three methylene groups (chemical shifts between 10 ppm and 60 ppm).

An exchange of the chloride ions is then effected by metathesis in an aqueous solution of lithium bistrifluoromethanesulfonamide prepared by adding 5.55 g of lithium bistrifluoromethanesulfonamide to 20 ml of distilled water. The chloride ions are completely exchanged with the bistrifluoromethanesulfonamide ions. After exchange the composition comprising functionalized synthetic mineral particles is recovered after centrifugation at 4000 rpm for 5 minutes.

EXAMPLE 2

A solution of magnesium acetate is prepared by adding 32.01 g of magnesium acetate tetrahydrate (Mg($CH_3$COO)$_2$·$4H_2O$), i.e. 149.26 mmol, to 99.5 ml of 1 mol/l acetic acid, $CH_3COOH$.

A solution of sodium metasilicate is prepared by adding 37.9 g of sodium metasilicate pentahydrate (178.67 mmol) to 150 ml of distilled water. The solution is heated gently to 40° C. to improve dissolution.

A solution of functionalized alkoxysilane is prepared by adding 5.575 g of 1-trimethoxysilylpropyl-3-methylimidazolium chloride (19.85 mmol) to 20 ml of distilled water. A solution containing 3.065 g of sodium iodide, NaI (20.448 mmol) in 10 ml of distilled water is then added, with magnetic stirring, so as to effect an exchange between the chloride ions, $Cl^-$, and iodide ions, $I^-$. The solution of functionalized alkoxysilane and sodium iodide, NaI, is stirred magnetically for 1 minute.

The whole of the solution of functionalized alkoxysilane prepared in this way is then added, with magnetic stirring, to the sodium metasilicate solution prepared previously.

Finally, the magnesium acetate solution is added to the solution containing the functionalized alkoxysilane and the sodium metasilicate, with magnetic stirring. A silico-metallic gel forms instantly. This silico-metallic gel is stirred for 5 minutes and then centrifuged for 5 minutes at 3500 rpm, after which it is washed three times by the addition of 100 ml of distilled water and centrifugation (5 minutes at 3500 rpm) so as to remove the salts formed during precipitation.

The recovered silico-metallic gel is then dried by lyophilization at −50° C. under 0.064 mbar. After drying by lyophilization, a white powder is recovered and dried in an oven at 130° C. for 2 hours to give 29 g of a composition comprising functionalized synthetic mineral particles, i.e. in which about 10% (atomic percentage) of the silicon atoms carry groups A of the following formula:

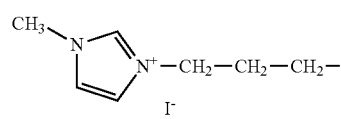

The functionalized synthetic mineral particles recovered after drying of the silico-metallic gel therefore have the formula $(Si_{0.9}(Si\text{-}A)_{0.1})_4Mg_3O_{11}\cdot n'H_2O$, n' referring to a number of water molecules associated with said particles.

EXAMPLE 3

A solution of magnesium acetate is prepared by adding 18.07 g of magnesium acetate tetrahydrate $(Mg(CH_3COO)_2\cdot 4H_2O)$, i.e. 84.79 mmol, to 57 ml of 1 mol/l acetic acid, $CH_3COOH$.

A solution of functionalized alkoxysilane and sodium metasilicate is prepared by adding 4.99 g of triethoxyaminopropylsilane (22.55 mmol) and then 19.14 g of sodium metasilicate pentahydrate (90.22 mmol) to 400 ml of distilled water.

Triethoxyaminopropylsilane has the following structural chemical formula:

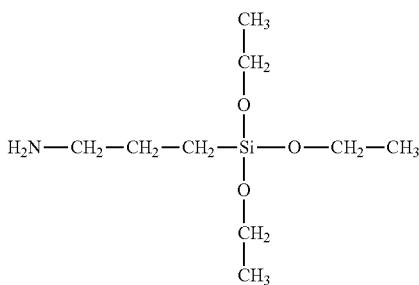

The magnesium acetate solution is added rapidly to the solution of functionalized alkoxysilane and sodium metasilicate; a silico-metallic gel forms instantly. This silico-metallic gel is stirred for 5 minutes and then centrifuged for 5 minutes at 4000 rpm, after which it is washed twice by the addition of 100 ml of distilled water and centrifugation (5 minutes at 3500 rpm).

The recovered silico-metallic gel is then dried by lyophilization at −50° C. under 0.064 mbar. After drying by lyophilization, 12.8 g of a composition comprising functionalized synthetic mineral particles, i.e. in which about 20% (atomic percentage) of the silicon atoms carry aminopropyl groups A, are then recovered as a white powder.

The silicon NMR spectrum (not shown) of this silico-metallic gel makes it possible to identify the presence of Si—O—Si groups (chemical shifts between −75 ppm and −100 ppm) as well as the presence of C—Si—O—Si groups (chemical shifts between −40 ppm and −60 ppm).

The carbon NMR spectrum (not shown) of this silico-metallic gel makes it possible to identify the presence of an $H_2N$—$CH_2$— group (chemical shifts around 42.2 ppm), an N—$CH_2$—$CH_2$—$CH_2$—Si group (chemical shifts around 24.4 ppm) and a $CH_2$—Si group (chemical shifts around 10.6 ppm).

The functionalized synthetic mineral particles recovered after drying of the silico-metallic gel therefore have the formula $(Si_{0.75}(Si\text{-}A)_{0.25})_4Mg_3O_{11}\cdot n'H_2O$, n' referring to a number of water molecules associated with said particles.

EXAMPLE 4

A solution of zinc acetate is prepared by adding 20.59 g of zinc acetate dihydrate $(Zn(CH_3COO)_2\cdot 2H_2O)$, i.e. 93.80 mmol, to 63.0 ml of 1 mol/l acetic acid.

A solution of sodium metasilicate is prepared by adding 21.17 g of sodium metasilicate pentahydrate, i.e. 90.22 mmol, to 200 ml of distilled water.

A solution of functionalized alkoxysilane is then prepared by adding 7.007 g of 1-trimethoxysilylpropyl-3-methylimidazolium chloride, i.e. 22.55 mmol, to 30 ml of distilled water. 2.7 g of sodium bromide, NaBr, i.e. 26 2 mmol, are then added, with magnetic stirring, so as to effect an exchange between the chloride ions, Cl⁻, and bromide ions, Br⁻. The solution of functionalized alkoxysilane and sodium bromide, NaBr, is stirred magnetically for 1 minute.

The whole of the solution of functionalized alkoxysilane prepared in this way is then added, with magnetic stirring, to the sodium metasilicate solution prepared previously.

Finally, the zinc acetate solution is added to the solution containing the functionalized alkoxysilane and the sodium metasilicate, with magnetic stirring. A silico-metallic gel forms instantly. This silico-metallic gel is stirred for 5 minutes and then centrifuged for 5 minutes at 3500 rpm, after which it is washed three times by the addition of 100 ml of distilled water and centrifugation (5 minutes at 5000 rpm) so as to remove the salts formed during precipitation.

The recovered silico-metallic gel is then dried by lyophilization at −50° C. under 0.064 mbar. After drying by lyophilization, a white powder is recovered and dried in an oven at 130° C. for 2 hours to give 20.40 g of a composition comprising functionalized synthetic mineral particles, i.e. in which about 20% (atomic percentage) of the silicon atoms carry groups A of the following formula:

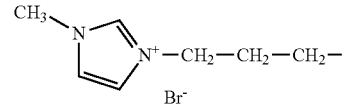

The silicon NMR spectrum (not shown) of this silico-metallic gel makes it possible to identify the presence of Si—O—Si groups (chemical shifts around −88.5 ppm and −97.7 ppm) as well as the presence of C—Si—O—Si groups (chemical shifts around −57 ppm).

The carbon NMR spectrum (not shown) of this silico-metallic gel makes it possible to identify the presence of an imidazolium group (chemical shifts between 120 ppm and 140 ppm) as well as the presence of a methyl group and three methylene groups (chemical shifts between 10 ppm and 60 ppm).

The functionalized synthetic mineral particles recovered after drying of the silico-metallic gel therefore have the formula $(Si_{0.75}(Si\text{-}A)_{0.25})_4Zn_3O_{11}\cdot n'H_2O$, n' referring to a number of water molecules associated with said particles.

What is claimed is:
1. A method for preparing a hydrogel comprising silico-metallic mineral particles of the formula $(Si_x(Si\text{-}A)_{1-x})_4M_3O_{11}\cdot n'H_2O$, in which:
x is a real number in the range of from 0.75 to 1, 1 being excluded from said range,
A denotes a methyl group or a hydrocarbon group with at least one heteroatom,
M is a metal selected from the group consisting of magnesium, cobalt, zinc, copper, manganese, iron, nickel and chromium, and
n' refers to a number of water molecules associated with said hydrogel,
said method comprising carrying out a coprecipitation reaction, in an aqueous medium, between:

at least one metal salt of said metal M,
sodium metasilicate, $Na_2OSiO_2$, and
at least one water-soluble oxysilane of formula (I):

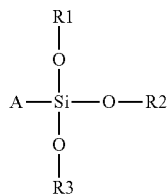
(I)

in which R1, R2 and R3 are identical or different and are hydrogen or a linear alkyl group of 1 to 3 carbon atoms.

2. The method as claimed in claim 1 wherein the group A has formula (II):

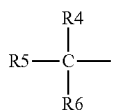
(II)

in which R4, R5 and R6 are identical or different and are hydrogen and a hydrocarbon group with at least one heteroatom.

3. The method as claimed in claim 1 wherein, in formula (I), A is a methyl group or a hydrocarbon group with at least one heteroatom according to formula $Y-[CH_2]_n-$, in which:
Y is a group comprising at least one nitrogen atom, and
n is an integer between 3 and 11.

4. The method as claimed in claim 3 wherein Y is selected from $H_2N-$ and

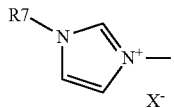

wherein:
R7 is a linear or a branched alkyl group with 1 to 18 carbon atoms, and
$X^-$ is an anion in which X is selected from the group consisting of chlorine, iodine and bromine.

5. The method as claimed in claim 4 wherein the anion $X^-$ is at least partially exchanged with at least one anionic species selected from the group consisting of a bistrifluoromethanesulfonamide anion, a trifluoromethanesulfonate anion, a hexafluorophosphate anion, a tetrafluoroborate anion, a tetrachloroaluminate anion, an acetate anion, a hydroxide anion, $HO^-$, a nitrate anion, $NO_3^-$, and a nitrite anion, $NO_2^-$.

6. The method as claimed in claim 1 wherein said oxysilane has the formula:

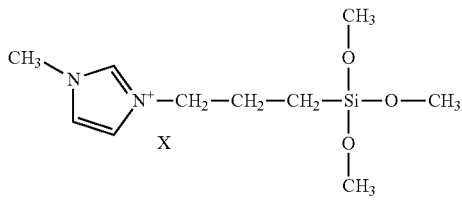

wherein $X^-$ is an anion wherein X is selected from the group consisting of chlorine, iodine and bromine.

7. The method as claimed in claim 1 wherein carrying out said coprecipitation reaction comprises bringing together said metal salt, said sodium metasilicate and said oxysilane in such a way that the atomic ratio between the metal M and the silicon is substantially equal to 0.75.

8. The method as claimed in claim 1 wherein the molar ratio between said oxysilane and said sodium metasilicate is between 0.10 and 0.34.

9. The method as claimed in claim 1 wherein said metal salt is a metal chloride of the formula $MCl_2$ or a metal acetate of the formula $M(CH_3COO)_2$.

10. The method as claimed in claim 1 further comprising adding at least one of hydrochloric acid or acetic acid to the aqueous medium comprising said at least one metal salt, said sodium metasilicate and said at least one water soluble oxysilane, the total number of moles of chloride ions and acetate ions being equal to the number of moles of sodium, Na, in said coprecipitation reaction medium.

11. A hydrogel of the formula $(Si_x(Si-A)_{1-x})_4M_3O_{11} \cdot n'H_2O$, in which:
x is a real number in the range of from 0.75 to 1, 1 being excluded from said range,
A denotes a methyl group or a hydrocarbon group with at least one heteroatom,
M is a metal selected from the group consisting of magnesium, cobalt, zinc, copper, manganese, iron, nickel and chromium, and
n' refers to a number of water molecules associated with said hydrogel,
wherein A is a methyl group or a hydrocarbon group of formula $Y-[CH_2]_n-$, in which:
n is an integer between 3 and 11, and
Y is a group of formula:

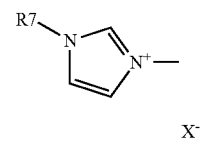

wherein
R7 is a linear or a branched alkyl group with 1 to 18 carbon atoms, and
$X^-$ is an anion in which X is selected from the group consisting of chlorine, iodine, and bromine.

* * * * *